US008675212B2

(12) United States Patent
Akiyama et al.

(10) Patent No.: US 8,675,212 B2
(45) Date of Patent: Mar. 18, 2014

(54) IMAGE PROCESSING APPARATUS, IMAGE PROCESSING METHOD, AND RECORDING MEDIUM

(75) Inventors: Fumihito Akiyama, Yokohama (JP); Masahiro Ozawa, Hino (JP); Jun Kuroki, Superior, CO (US); Hiroshi Nogawa, Hachioji (JP); Yasufumi Aoyama, Hino (JP); Kunikazu Satou, Tama (JP); Yasutaka Shimohara, Hachioji (JP); Takahisa Matsunaga, Hino (JP); Tetsuren Ri, Hino (JP)

(73) Assignee: Konica Minolta Business Technologies, Ltd., Chiyoda-Ku, Tokyo (JP)

( * ) Notice: Subject to any disclaimer, the term of this patent is extended or adjusted under 35 U.S.C. 154(b) by 86 days.

(21) Appl. No.: 13/044,993

(22) Filed: Mar. 10, 2011

(65) Prior Publication Data

US 2012/0086964 A1   Apr. 12, 2012

(30) Foreign Application Priority Data

Mar. 11, 2010   (JP) .................................. 2010-053901

(51) Int. Cl.
   *G06F 3/12*   (2006.01)
(52) U.S. Cl.
   USPC ......................................... 358/1.13; 358/1.15
(58) Field of Classification Search
   None
   See application file for complete search history.

(56) References Cited

U.S. PATENT DOCUMENTS

| | | | |
|---|---|---|---|
| 7,755,781 B2 | 7/2010 | Ozawa et al. | |
| 7,869,072 B2 | 1/2011 | Gong | |
| 8,189,221 B2 | 5/2012 | Matsumoto et al. | |
| 2008/0018933 A1 | 1/2008 | Ozawa et al. | |
| 2008/0137135 A1* | 6/2008 | Takeishi | ................. 358/1.15 |
| 2009/0323111 A1* | 12/2009 | Goda | ................. 358/1.15 |

FOREIGN PATENT DOCUMENTS

| | | |
|---|---|---|
| JP | 07-064736 A | 3/1995 |
| JP | 2001228991 A | 8/2001 |

(Continued)

OTHER PUBLICATIONS

Office Action from the Japan Patent Office dated Apr. 23, 2013, issued in corresponding Japanese Patent Application No. 2010-053901, with English translation thereof. (12 pages).

(Continued)

*Primary Examiner* — Vincent Rudolph
*Assistant Examiner* — Moustapha Diaby
(74) *Attorney, Agent, or Firm* — Buchanan Ingersoll & Rooney PC

(57) ABSTRACT

Disclosed is an image processing apparatus, comprising: a control section including a plurality of operation units; and a nonvolatile storage section to store a program to execute analysis processing and rendering processing by a control of the control section, the analysis processing analyzing page description language format data to generate intermediate language format data by the band, and the rendering processing generating rendering data based on the generated intermediate language format data, wherein the control section assigns the operation units the analysis and rendering processing to be executed, based on the stored program, wherein at least one of the operation units is capable of executing the analysis and rendering processing, and wherein when the operation unit is executing one of the analysis and rendering processing, and when an event which suspends the processing being executed occurs, the operation unit executes the other processing.

21 Claims, 18 Drawing Sheets

(56) References Cited

FOREIGN PATENT DOCUMENTS

| | | | |
|---|---|---|---|
| JP | 2001318769 A | 11/2001 |
| JP | 2004-326307 A | 11/2004 |
| JP | 2005254469 A | 9/2005 |
| JP | 2006155308 A | 6/2006 |
| JP | 2007-156613 A | 6/2007 |
| JP | 2008-023897 A | 2/2008 |
| JP | 2008143067 A | 6/2008 |
| JP | 2008254346 A | 10/2008 |

OTHER PUBLICATIONS

Office Action from the Patent Office of the People's Republic of China dated May 24, 2013, issued in corresponding Chinese Patent Application No. 201110059096.5, with English translation thereof. (14 pages).

Office Action from the Japan Patent Office dated Jul. 9, 2013, issued in corresponding Japanese Patent Application No. 2010-053901, with English translation thereof. (6 pages).

* cited by examiner

55

| EVENT | ACTION | NEXT EVENT |
|---|---|---|
| WAITING FOR VACANT REGION | RENDERING REQUEST IS NOTIFIED | WAITING FOR RENDERING OF 1 PAGE TO BE COMPLETED |
| JOB TERMINATION IS DETECTED | RENDERING REQUEST IS NOTIFIED | WAITING FOR RENDERING OF 1 PAGE TO BE COMPLETED |
| RENDERING OF 1 PAGE IS COMPLETED | VACANT REGION IS OBTAINED | ANALYSIS PROCESSING |
| ⋮ | ⋮ | ⋮ |

| EVENT | ACTION | NEXT EVENT |
|---|---|---|
| RENDERING REQUEST NOTIFICATION IS RECEIVED | 1 PAGE IS RENDERED | RENDERING OF 1 PAGE IS COMPLETED |
| RENDERING OF 1 PAGE IS COMPLETED | COMPLETION OF RENDERING OF 1 PAGE IS NOTIFIED | WAITING FOR RENDERING REQUEST |
| ⋮ | ⋮ | ⋮ |

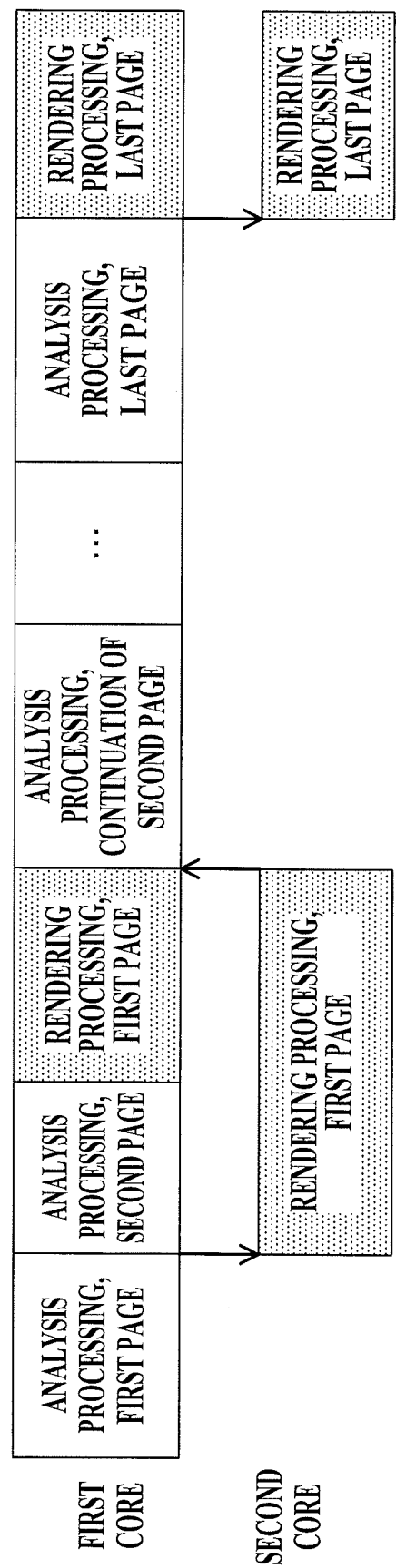

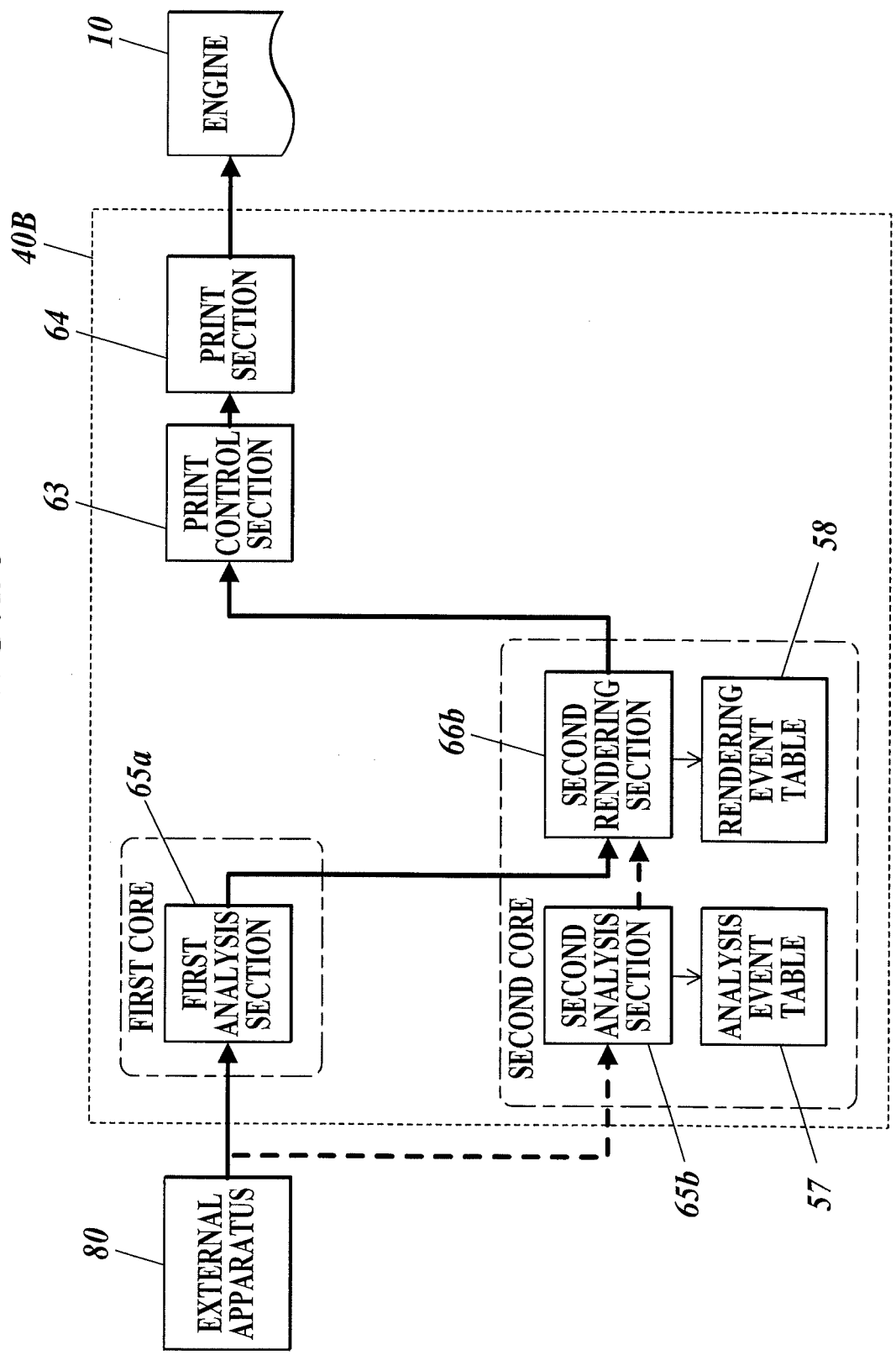

FIG.11

| EVENT | ACTION | NEXT EVENT |
|---|---|---|
| ANALYSIS REQUEST NOTIFICATION IS RECEIVED | ANALYSIS PROCESSING | WAITING FOR ANALYSIS REQUEST NOTIFICATION TO BE RECEIVED |
| ANALYSIS OF 1 PAGE IS COMPLETED | RENDERING REQUEST IS NOTIFIED | WAITING FOR ANALYSIS REQUEST NOTIFICATION TO BE RECEIVED |
| ⋮ | ⋮ | ⋮ |

58

| EVENT | ACTION | NEXT EVENT |
|---|---|---|
| WAITING FOR VACANT REGION | ANALYSIS REQUEST IS NOTIFIED | WAITING FOR RENDERING MEMORY RELEASE NOTIFICATION |
| RENDERING OF 1 PAGE IS COMPLETED | COMPLETION OF RENDERING OF 1 PAGE IS NOTIFIED | WAITING FOR RENDERING REQUEST NOTIFICATION |
| RENDERING MEMORY RELEASE NOTIFICATION IS RECEIVED | VACANT REGION IS OBTAINED | • RENDERING PROCESSING WHEN OBTAINMENT IS SUCCESSFUL<br>• WAITING FOR VACANT REGION WHEN OBTAINMENT FAILS |
| ⋮ | ⋮ | ⋮ |

IMAGE PROCESSING APPARATUS, IMAGE PROCESSING METHOD, AND RECORDING MEDIUM

CROSS-REFERENCE TO RELATED APPLICATION

The present U.S. patent application claims a priority under the Paris Convention of Japanese patent application No. 2010-053901 filed on Mar. 11, 2010, which shall be a basis of correction of an incorrect translation.

BACKGROUND OF THE INVENTION

1. Field of the Invention

The present invention relates to an image processing apparatus, an image processing method, and a recording medium.

2. Description of the Related Art

In recent years, multi-core processors including a plurality of operation units such as processor cores (hereinafter, referred to as cores) integrated in one package have been developed. In a multi-core processor, processing is distributed to each of the plurality of cores for parallel processing, thus achieving an improved processing performance.

Specifically, there have been some propositions regarding image forming apparatuses such as MFPs (multi-function printers) and printers which use such a multi-core processor to assign each process to the cores for parallel processing, thus increasing in print processing speed.

For example, Japanese Patent Application Laid-open Publication No. 2004-326307 discloses an image forming apparatus including a plurality of processors. In this image forming apparatus, the processing of printing image data is divided into a plurality of processes, and each processor handles at least one of the plurality of processes. The assignment of the processes to the processors is controlled based on the processing status of each process handled by the processors so that the process handled by each processor is changed according to the processing load of each of the processors.

In the conventional art of Japanese Patent Application Laid-open Publication No. 2004-326307, however, when an event which prevents processing from being continued occurs (for example, the event may be a case waiting for a vacant region in a memory region used in each processing executed to generate print data for forming an image on paper or the like), the core which is executing the processing including the event is to be in a standby mode until the event is dissolved. This reduces the processing efficiency.

SUMMARY OF THE INVENTION

The present invention was made in the light of the aforementioned circumstances, and an object of the present invention is to provide an image processing apparatus using a control section comprising a plurality of operation units to execute a plurality of processes, so that the processing standby time of the operation units is shortened and the processing efficiency is increased.

To achieve at least one of the abovementioned objects, an image processing apparatus, reflecting one aspect of the present invention comprises:

a control section including a plurality of operation units; and a nonvolatile storage section to store a program to execute analysis processing and rendering processing by a control of the control section, the analysis processing analyzing page description language format data to generate intermediate language format data by the band, and the rendering processing generating rendering data based on the intermediate language format data generated by the analysis processing, wherein the control section assigns the plurality of operation units the analysis processing and the rendering processing to be executed, based on the program stored in the nonvolatile storage section, wherein at least one of the plurality of operation units is capable of executing the analysis processing and the rendering processing, and wherein when the operation unit is executing one of the analysis processing and the rendering processing, and when an event which suspends the processing being executed occurs, the operation unit executes the other processing.

To achieve at least one of the abovementioned objects, an image processing method of an image processing apparatus including: a control section having a plurality of operation units; and a nonvolatile storage section to store a program to execute analysis processing and rendering processing by a control of the control section, the analysis processing analyzing page description language format data to generate intermediate language format data by the band, and the rendering processing generating rendering data based on the intermediate language format data generated by the analysis processing, wherein the analysis processing and the rendering processing are assigned to the plurality of operation units to be executed, the image processing method, reflecting another aspect of the present invention comprises:

a first step of assigning at least one of the plurality of operation units in the image processing apparatus the analysis processing and the rendering processing to be executed; and a second step of, when the operation unit capable of executing the analysis processing and the rendering processing is executing one of the analysis processing and rendering processing, and when an event which suspends the processing being executed occurs, instructing the operation unit to execute the other processing.

To achieve at least one of the abovementioned objects, a recording medium storing a computer-executable program to be executed by a computer including a plurality of operation units, the program assigning the plurality of operation units analysis processing and rendering processing, the analysis processing analyzing page description language format data to generate intermediate language format data by the band, and the rendering processing generating rendering data based on the intermediate language format data generated by the analysis processing, reflecting still another aspect of the present invention, causing the control section to execute:

a first function of assigning at least one of the plurality of operation units the analysis processing and the rendering processing to be executed, and a second function of, when the operation unit is executing one of the analysis processing and rendering processing, and when an event which suspends the processing being executed occurs, instructing the operation unit to execute the other processing.

BRIEF DESCRIPTION OF THE DRAWINGS

The present invention will become more fully understood from the detailed description given hereinbelow and the appended drawings, and thus are not intended as a definition of the limits of the present invention, wherein;

FIG. 5 is a view showing an example of a rendering event table in the first embodiment;

FIG. 9B is a view showing an operation example of the first embodiment;

FIG. 10 is a functional configuration diagram of an image processing apparatus in a second embodiment;

FIG. 11 is a view showing an example of an analysis event table in the second embodiment;

FIG. 12 is a view showing an example of a rendering event table in the second embodiment;

DETAILED DESCRIPTION OF THE PREFERRED EMBODIMENTS

First Embodiment

Hereinbelow, a description will be given in detail for a first embodiment of the present invention with reference to the drawings.

First, the configuration of the first embodiment will be described.

Figure 1:
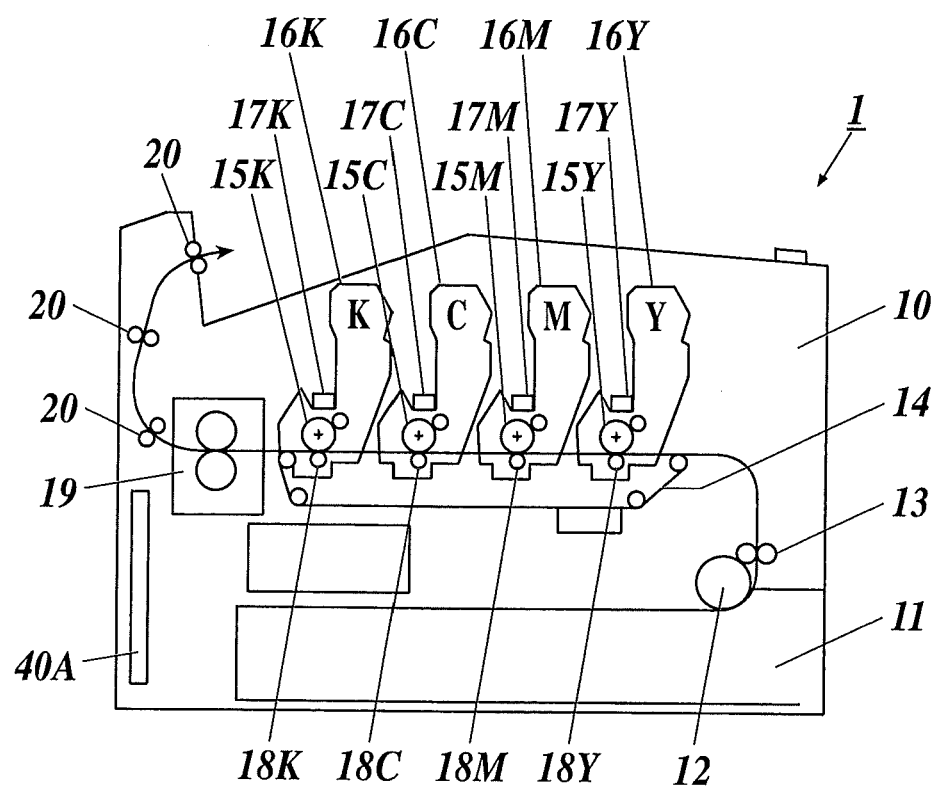
FIG. 1 is a main configuration diagram of an image forming apparatus.

FIG. 1 shows a main configuration diagram of an image forming apparatus 1.

As shown in FIG. 1, the image forming apparatus 1 includes an engine 10 and an image processing apparatus 40A.

The engine 10 is an apparatus which forms an image on a print medium such as paper based on print data outputted from the image processing apparatus 40A.

The engine 10 in the first embodiment is configured to transfer four colors of yellow (Y), magenta (M), cyan (c), and black (K) through individual electrostatic drums (a tandem electrophotographic process).

As shown in FIG. 1, the engine 10 includes a paper cassette 11, a paper feeding roller 12, conveying rollers 13, a conveying belt 14, electrostatic drums 15Y, 15M, 15C, and 15K, print units 16Y, 16M, 16C, and 16K, laser units 17Y, 17M, 17C, and 17K, transfer rollers 18Y, 18M, 18C, and 18K, a fixing unit 19, paper ejecting rollers 20, and the like.

The paper cassette 11 houses print media such as sheets of paper. The sheets of paper housed in the paper cassette 11 are pulled out one by one by the paper feeding roller 12, and the pulled out sheets of paper are conveyed by the conveying roller 13 to the conveying belt 14.

Onto each of the sheets of paper conveyed to the conveying belt 14, yellow, magenta, cyan, and black toner images formed on the electrostatic drums 15Y, 15M, 15C, and 15K are transferred.

The processing of transferring a yellow (Y) toner image onto a sheet of paper will be described.

The electrostatic drum 15Y is a cylindrical member, and the circumferential surface of the cylinder is electrically charged by a charge unit (not shown). The charged circumferential surface of the electrostatic drum 15Y is irradiated by a laser beam of the laser unit 17Y based on print data according to an yellow image to be formed on the sheet. An electrostatic latent image is thus formed on the circumferential surface of the electrostatic drum 15Y.

The print unit 16Y includes a toner cartridge accommodating yellow (Y) toner and a development unit causing the toner accommodated in the toner cartridge to adhere to the electrostatic latent image.

The print unit 16Y causes the yellow (Y) toner to adhere to the electrostatic latent image formed on the circumferential surface of the electrostatic drum 15Y, thereby to be developed, thus forming a toner image of yellow (Y) on the circumferential surface of the electrostatic drum 15Y.

At the position facing the electrostatic drum 15Y, having the conveying belt 14 in between, the transfer roller 18Y is provided. The toner image formed on the circumferential surface of the electrostatic drum 15Y is transferred onto the sheet of paper by the oppositely charged transfer roller 18Y when the sheet of paper is sandwiched by the conveying belt 14 and the electrostatic drum 15Y.

In the same manner as to the aforementioned transfer of the yellow (Y) toner image by the electrostatic drum 15Y, the electrostatic drum 15M transfers a toner image of magenta (M) toner accommodated in a toner cartridge of the print unit 16M; the electrostatic drum 15C transfers a toner image of cyan (C) toner accommodated in a toner cartridge of the print unit 16C; and the electrostatic drum 15K transfers a toner image of black (K) toner accommodated in a toner cartridge of the print unit 16K.

The sheet of paper onto which the toner images of four colors are transferred so as to be superimposed on each other is conveyed to the fixing unit 19.

The fixing unit 19 is configured to fix the toner images transferred onto the surface of the sheet of paper.

The sheet of paper with the toner images fixed thereon is conveyed by the paper ejecting rollers 20 and is ejected onto a catch tray (not shown).

The process of print processing for paper is described above, however, the print processing may also be performed for print media other than paper in a similar manner.

Figure 2:
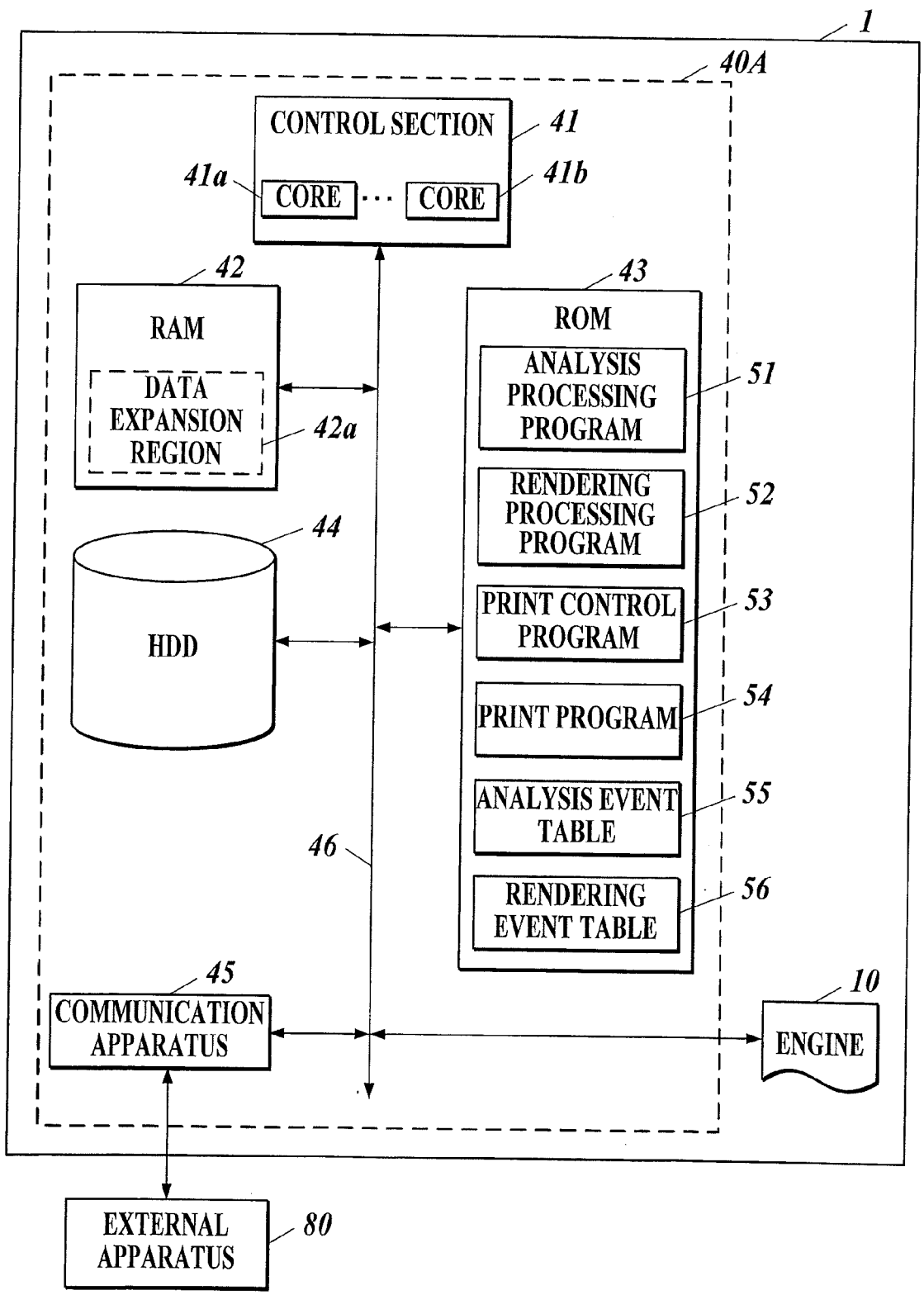
FIG. 2 is a control block diagram of the image forming apparatus.

FIG. 2 shows a control block diagram of the image forming apparatus 1.

As shown in FIG. 2, the image processing apparatus 40A includes a control section 41, a random access memory (RAM) 42, a read only memory (ROM) 43, a hard disk drive (HDD) 44, a communication apparatus 45, and the like, which are connected to each other through a bus 46.

The control section 41 is composed of a multi-core processor including a plurality of operation units (hereinafter, referred to as cores) such as processor cores. In the first embodiment, the control section 41 includes two cores (a first core 41a and a second core 41b).

The control section 41 may alternatively be composed of central processing units (CPUs) instead of cores so as to exert a function equivalent to the multi-core processor.

The control section 41 expands various processing programs and data stored in the ROM 43 in the RAM 42, and controls the operation of each section of the image forming apparatus 1 based on the programs in a centralized manner. For example, the control section 41 reads out a processing program for each mode according to an instruction signal inputted from an external apparatus 80 connected to the communication apparatus 45 and controls various processing, and the like.

The RAM 42 includes regions where various programs to be executed by the control section 41, various data, and the like are temporarily expanded, and data processed by the various programs and the like are temporarily stored. The RAM 42 of the first embodiment especially functions as a storage section having a data expansion region 42a used when later-described analysis and rendering processes are executed. The data expansion region 42a includes an analysis expansion region used for execution of the analysis processing and a rendering expansion region used for execution of the rendering processing.

The ROM 43 stores programs and data for various processings to be executed by the control section 41 and the like. For example, the ROM 43 is a nonvolatile memory storing an analysis processing program 51, a rendering processing program 52, a print control program 53, a print program 54, an analysis event table 55, a rendering event table 56, and the like. The ROM 43 may be replaced with a nonvolatile readable storage medium such as a magnetic or optical storage medium or a semiconductor memory. The ROM 43 may be configured to be fixed to or detachably attached to a control substrate, and the like.

The HDD 44 stores an operation program, various application programs, and various data including job data in a state of being related to predetermined addresses.

The HDD 44 may be replaced with a compact flash (CF) or the like and may be a readable/writable nonvolatile storage medium.

The communication apparatus 45 connects the image processing apparatus 40A and the external apparatus 80 so that the image processing apparatus 40A and the external apparatus 80 can communicate with each other. The communication apparatus 45 can be composed of various types of apparatuses enabling connection with an external network through a wireless LAN (local area network), Bluetooth, Internet connection, and other methods, for example. The communication apparatus 45 includes communication functions of the aforementioned various methods. Examples of the external apparatus 80 connected to the communication apparatus 45 so as to communicate with the same may be a personal computer (PC), a mobile phone, a work station connected through an external network, and the like.

The bus 46 connects each section of the image processing apparatus 40A with the engine 10.

Next, a description will be given for functions of the image processing apparatus 40A in the first embodiment.

Figure 3:
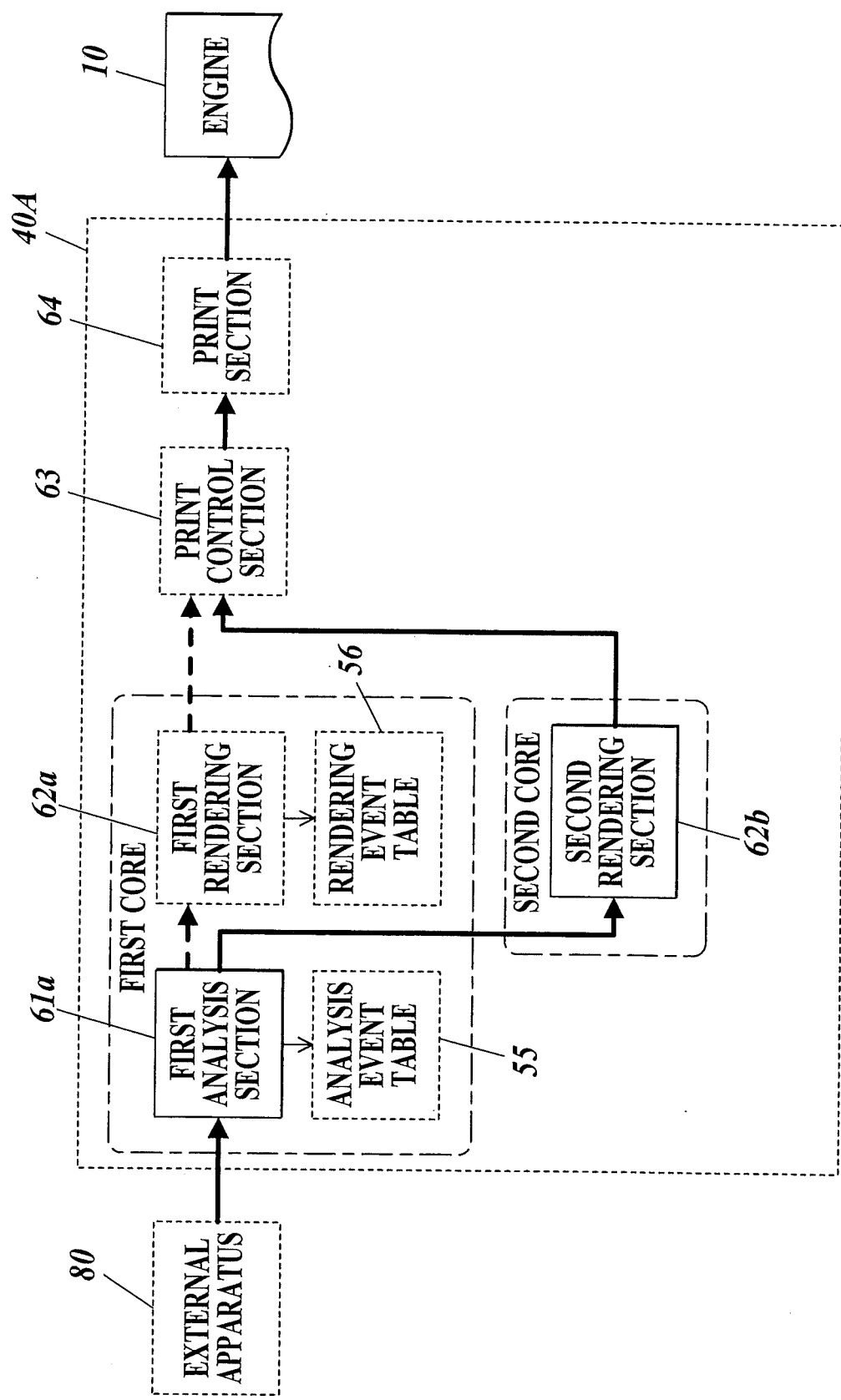
FIG. 3 is a functional configuration diagram of an image processing apparatus according to the first embodiment.

FIG. 3 shows a functional configuration diagram of the image processing apparatus 40A.

As shown in FIG. 3, the image processing apparatus 40A functions as a first analysis section 61a, a first rendering section 62a, a second rendering section 62b, a print control section 63, and a print section 64.

Thick solid arrows in the drawing indicate a data flow, and thick dashed arrows indicate a data flow added when the first analysis section 61a is suspended.

Each core constituting the control section 41 reads a program corresponding to assigned processing from the ROM 43 and executes the same to implement each function of the image processing apparatus 40A.

The first core 41a is previously assigned with the analysis processing and rendering processing so as to execute the same. The first core 41a reads and executes the analysis processing program 51 to function as the first analysis section 61a, and reads and executes the rendering processing program 52 to function as the first rendering section 62a. As for the analysis processing and rendering processing assigned to the first core 41a, the analysis processing is set to have a higher priority of execution than that of the rendering processing.

The second core 41b is previously assigned with the rendering processing. The second core 41b reads and executes the rendering processing program 52 to function as the second rendering section 62b.

Moreover, the first core 41a, second core 41b, or another core executes the print control program 53 and print program 54 to function as the print control section 63 and print section 64, respectively.

Next, the function of each section will be described.

The first analysis section 61a interprets data inputted from the external apparatus 80 with reference to the analysis event table 55, and generates intermediate language format data (hereinafter, referred to as intermediate data) which is between the inputted data and bitmap format data (hereinafter, referred to as bitmap data) by the band. The first analysis section 61a then stores the generated intermediate data in an analysis expansion region of the data expansion region in the RAM 42.

The data inputted from the external apparatus 80 include page-description language format data (hereinafter, referred to as PDL data) such as PostScript (registered trademark) and PCL and image data of a description language format such as PDF (portable document format) and XPS (XML paper specification). These are collectively referred to as page description language data.

The intermediate data is data (a display list, PostScript, and the like) generated according to the properties of an object (text data, graphics data, image data, and the like) contained in the page description language data. For example, the intermediate data for text data and graphics data is vector format data, and the intermediate data for image data is image format data.

Figure 4:
FIG. 4 is a view showing an example of an analysis event table in the first embodiment.

FIG. 4 shows an example of the analysis event table 55 in the first embodiment.

The analysis event table 55 is provided for the analysis processing program to execute the analysis processing. The analysis event table 55 includes records each relating an event which can occur during execution of the analysis processing (an event) to instruction information of processing to be executed for the event (an action) and an event which occurs after execution of the action (a next event). The records are set in terms of the events which can occur during the analysis processing. The analysis event table 55 of the first embodiment includes, as the event information, a record relating an event which suspends the analysis processing to an action requesting execution of the rendering processing which has a lower priority of execution than the analysis processing and is different from the analysis processing.

The events which suspend the analysis processing include "Waiting for vacant region" and "Job termination is detected".

The event "Waiting for vacant region" is an event which occurs due to absence of a vacant region to store intermediate data in the analysis expansion region of the data expansion region in the RAM 42, for example. The analysis expansion region is configured to store the intermediate data generated by the analysis processing. The event "Waiting for vacant region" represents absence of a vacant region in the analysis expansion region used for execution of the analysis processing. The action of the record including the event "Waiting for vacant region" is "Rendering request is notified" to output a notification of a request for the rendering processing. The next event thereof is "Waiting for rendering of 1 page to be completed" to wait for the rendering processing of one page to be completed.

The event "Job termination is detected" is an event which occurs when it is detected that the analysis processing for the job is terminated, for example in the case where a job termination command included in a print job inputted from the external apparatus is analyzed, or the like. The event "Job termination is detected" represents absence of page description language data intended to be subjected to the analysis processing. The action and next event of the record including the event "Job termination is detected" are the same as those of the record including the event "Waiting for vacant region".

In response to the request from the first analysis section 61a, the first rendering section 62a refers to the rendering event table 56 to generate bitmap data from the intermediate data which is generated by the first analysis section 61a, and stored in the analysis expansion region, and then stores the generated bitmap data in the rendering expansion region of the data expansion region in the RAM 42.

FIG. 5 shows an example of the rendering event table 56 in the first embodiment.

The rendering event table 56 is provided for the rendering processing program to execute the rendering processing. The rendering event table 56 includes records each relating an event which can occur during execution of the rendering processing (an event), instruction information of a processing to be executed for the event (an action), and an event which occurs after execution of the action (a next event). The records are set in terms of the events which can occur during execution of the rendering processing.

The second rendering section 62b generates bitmap data from the intermediate data which is generated by the first analysis section 61a and stored in the analysis expansion region, and outputs the generated bitmap to the print control section 63.

The print control section 63 reads the bitmap data which is generated by the first or second rendering section 62a, 62b and stored in the rendering expansion region, and performs various processing for the read bitmap data, such as layout processing for printing on a print medium. The print control section 63 outputs the processed data to the print section 64 and then outputs a notification to release the bitmap data corresponding to the outputted data from the rendering expansion region (rendering expansion region release notification). Examples of the processing performed by the print control section 63 are control according to the selection of one-side printing or double-side printing, control of print accompanied with allocation of pages, and the like.

The print section 64 generates print data based on the processed data inputted from the print control section 63, and outputs the generated print data to the engine 10. The engine 10 performs print processing based on the print data inputted from the print section 64.

Next, the operation of the first embodiment will be described.

Figure 6:
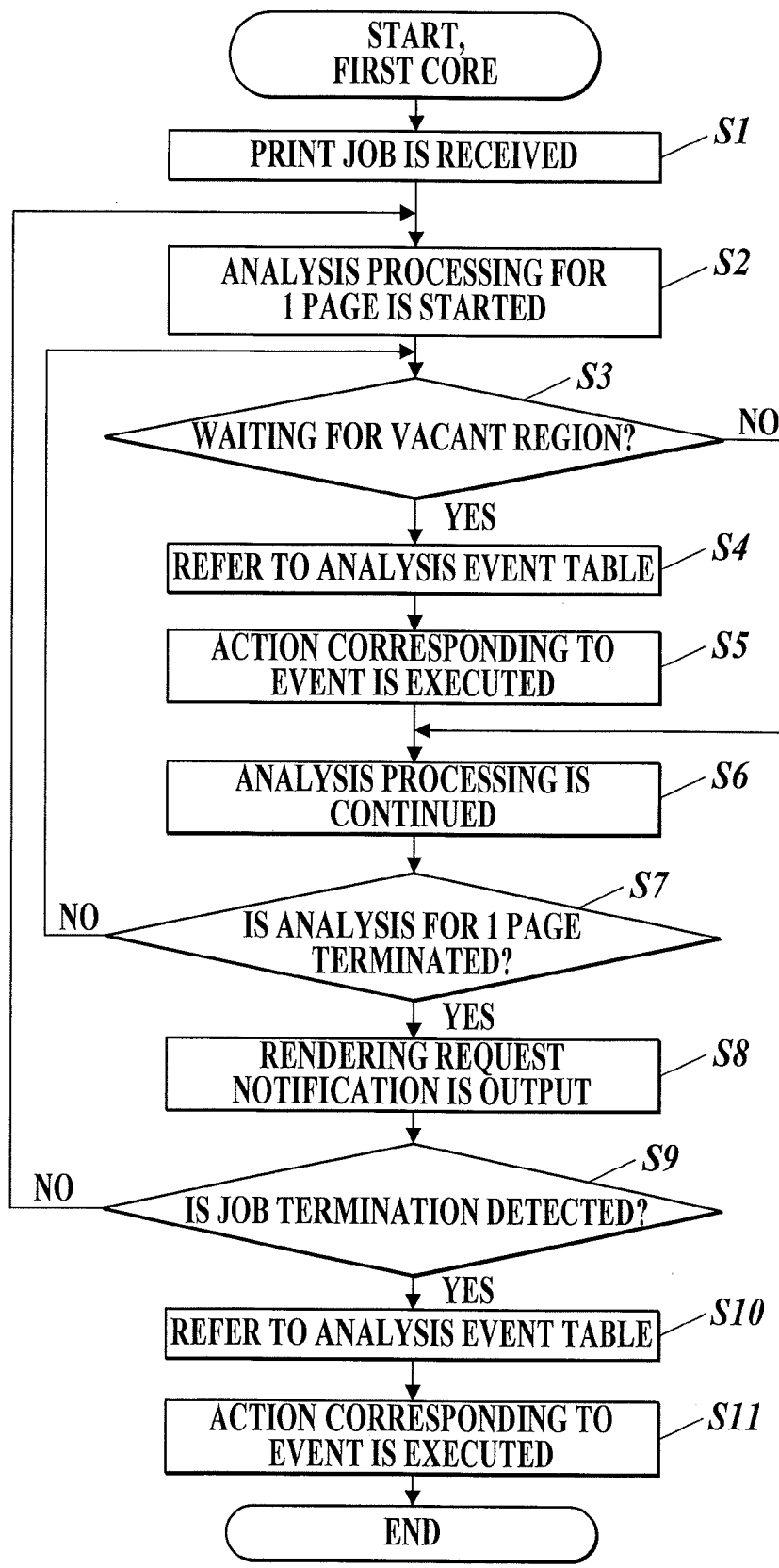
FIG. 6 is a flowchart of an operation executed by a first core in the first embodiment.

FIG. 6 shows a flowchart of the operation executed by the first core 41a in the first embodiment.

Upon receiving a print job including page description language data of one or a plurality of pages from the external apparatus 80 through the communication apparatus 45 (step S1), the first core 41a causes the first analysis section 61a to function, and to start execution of the analysis processing for the page description language data of one page (step S2).

The first core 41a which is causing the first analysis section 61a to function judges whether the event "Waiting for vacant region" occurs during the execution of the analysis processing by the first analysis section 61a (step S3). If the event "Waiting for vacant region" does not occur (step S3; No), the first core 41a proceeds to the processing of step S6.

If the event "Waiting for vacant region" occurs (step S3; YES), the first core 41a refers to the analysis event table 55 to select a record corresponding to the event "Waiting for vacant region" (step S4), executes an action of the selected record ("Rendering request is notified"), and then causes the first rendering section 62a to function for the rendering processing (step S5).

After it is judged NO in the step S3 or after the step S5, the first core 41a returns to continue the analysis processing by the first analysis section 61a (the step S6) and judges whether the analysis processing of one page is terminated (step S7). If the analysis processing of one page is not terminated (the step 7; NO), the first core 41a returns to the processing of the step S3.

If the analysis processing of one page is terminated (the step S7; YES), the first core 41a outputs a rendering request notification to the second core 41b (step S8) and judges whether the event "Job termination is detected" occurs, that is to say, whether the analysis processing of all the pages included in the print job is terminated (step S9).

If the event "Job termination is detected" does not occur (the step S9; NO), the first core 41a returns to the processing of the step S2. If the event "Job termination is detected" occurs (the step S9; YES), the first core 41a refers to the analysis event table 55 to select a record corresponding to the event "Job termination is detected" (step S10). The first core 41a then executes the action of the selected record ("Rendering request is notified") and causes the first rendering section 62a to function for the rendering processing (step S11), thus terminating this processing.

Figure 7:
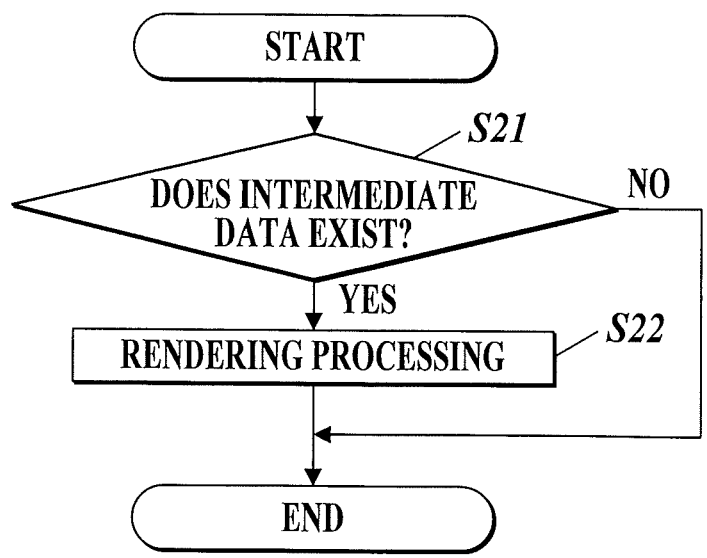
FIG. 7 is a flowchart of an operation executed at step S5 by a first rendering section caused to function by the first core.

FIG. 7 shows a flowchart of the operation executed at the step S5 by the first rendering section 62a caused to function by the first core 41a.

When the rendering request notification is outputted from the first analysis section 61a, the first core 41a causes the first rendering section 62a to function, and judges whether there is intermediate data in the analysis expansion region (step S21). If there is no intermediate data in the analysis expansion region (step S21; NO), the first core 41a terminates this processing.

If there is intermediate data in the analysis expansion region of the RAM 42 (step S21; YES), the first core 41a generates bitmap data of one band from the intermediate data stored in the analysis expansion region (step S22) and terminates this processing.

The flowchart of the operation executed at the step S11 by the first rendering section 62a caused to function by the first core 41a is the same as the flowchart shown in FIG. 7 except the processing of returning to the step S21 after the step S22. The description and drawings thereof are therefore omitted. In other words, the operation flow executed at the step S11 by the first rendering section 62a caused to function by the first core 41a is for generating bitmap data by the band until the intermediate data stored in the analysis expansion region no longer exists.

Figure 8:
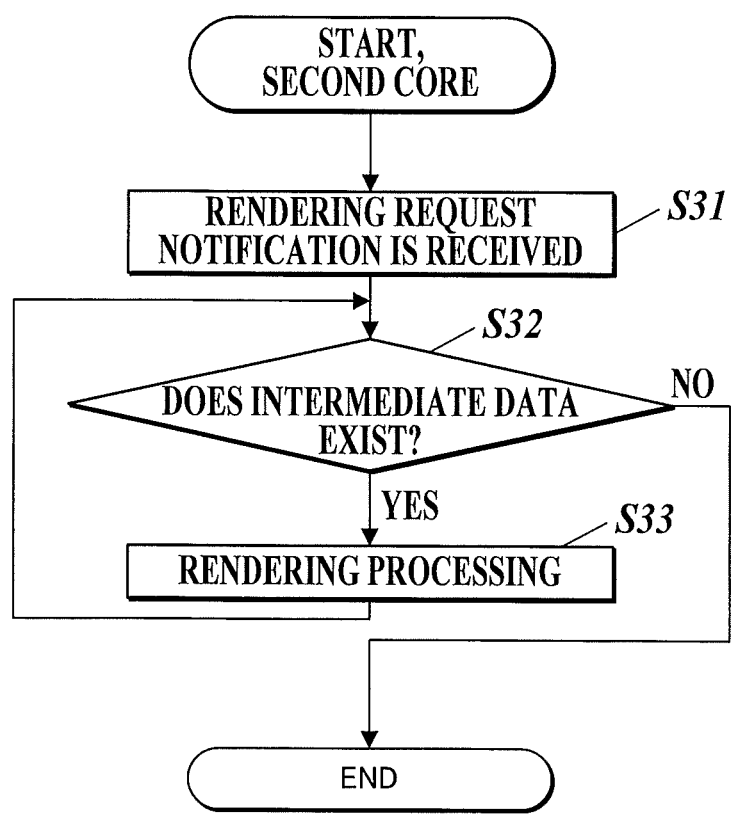
FIG. 8 is a flowchart of an operation executed by a second core in the first embodiment.

FIG. 8 shows a flowchart of the operation executed by the second core 41b in the first embodiment.

Upon receiving the rendering request notification (step S31), the second core 41b causes the second rendering section 62b to function and judges whether there is intermediate data in the analysis expansion region (step S32).

If there is intermediate data in the analysis expansion region (the step S32; YES), the second core 41b executes the rendering processing for the intermediate data stored in the analysis expansion region to generate bitmap data of one band (step S33), and returns to the processing of the step S32. If there is no intermediate data in the analysis expansion region (the step S32; NO), the second core 41b terminates this processing.

Figure 9A:
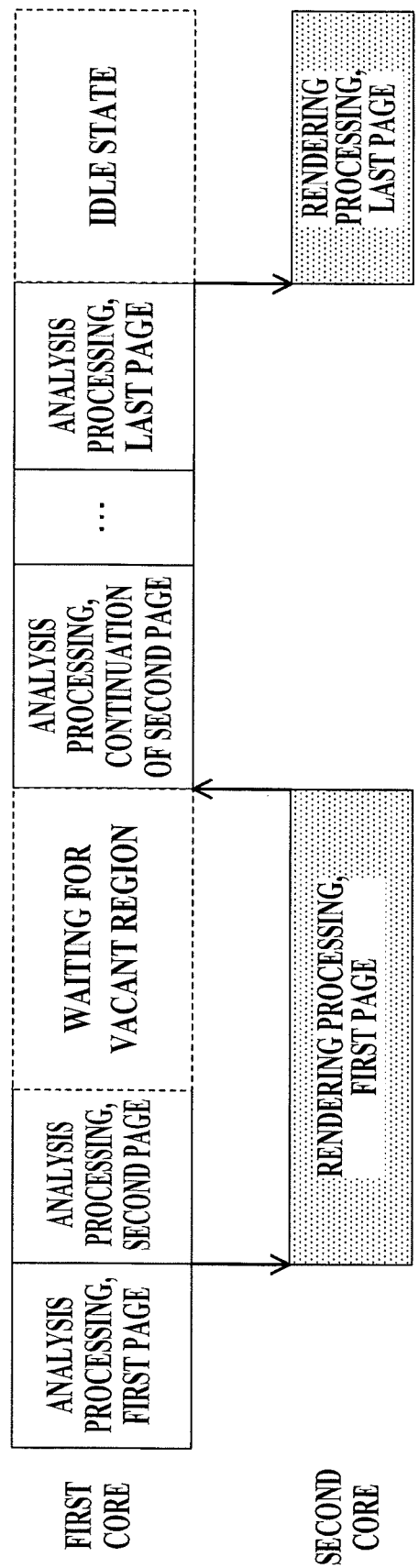
FIG. 9A is a view showing a conventional operation example.

FIG. 9A shows a conventional operation example, and FIG. 9B shows an operation example of the first embodiment.

In the conventional operation example shown in FIG. 9A, the first and second cores are previously assigned with the analysis processing and rendering processing, respectively.

As shown in FIG. 9A, in the conventional operation, when the event of waiting for a vacant region in the analysis expansion region occurs while the analysis processing of the second page is being executed by the first core, the analysis processing is suspended until a vacant region is generated in the analysis expansion region (herein, until the rendering processing of the first page is completed). Moreover, when the analysis processing of the final page is terminated, the first core goes into an idle state, and the rendering processing is executed by only the second core.

Accordingly, the conventional operation spends wasted time when the first core is not operating, thus resulting in a lower efficiency of the series of processing to generate print data.

In the first embodiment, as shown in FIG. 9B, when the event of waiting for a vacant region in the analysis expansion region occurs while the analysis processing of the second page is being executed by the first core, the rendering request notification is outputted. Upon the output of the rendering request notification, the first core causes the first rendering section 62a to function and executes the rendering processing of the page currently being subjected to the rendering processing (herein, the first page) until a vacant region is generated in the analysis expansion region (herein, until the rendering processing for the first page is completed). When the rendering processing of the first page is completed and the event of waiting for a vacant region in the analysis expansion region is resolved, the first core restarts the analysis processing at the first analysis section 61a. The rendering processing of the first page is thus executed by both the first and second cores. Accordingly, the time taken to complete the rendering processing of the first page is shortened, and the wasted time when the first core is not operating can be eliminated.

Moreover, after completing the analysis processing for the final page, the first core executes the rendering processing for the final page. Accordingly, the rendering processing for the final page is executed by both the first and second cores, and the time taken to complete the rendering processing of the final page is shortened. Moreover, the wasted time when the first core is not operating can be eliminated.

Consequently, in the first embodiment, it is possible to reduce the wasted time when the first core is not operating and provide a higher efficiency of the series of processing to generate print data than that of the conventional apparatus.

Second Embodiment

Hereinbelow, a description will be given for a second embodiment of the present invention with reference to the drawings.

First, the configuration of the second embodiment will be described.

The main configuration of the image forming apparatus in the second embodiment and the control block diagram of the image forming apparatus 1 are the same as the main configuration of the image forming apparatus shown in FIG. 1 and the control block diagram of the image forming apparatus 1 shown in FIG. 2, respectively, except for the following configurations: the image forming apparatus 1 of the second embodiment includes an image processing apparatus 40B instead of the image processing apparatus 40A included in the image forming apparatus 1 of the first embodiment; and analysis and rendering event tables 57 and 58 are used instead of the analysis and rendering event tables 55 and 56. The drawings and description of the same configurations are therefore omitted.

Next, the function of the image processing apparatus 40B in the second embodiment will be described.

FIG. 10 shows a functional configuration diagram of the image processing apparatus 40B.

As shown in FIG. 10, the image processing apparatus 40B functions as a first analysis section 65a, a second analysis section 65b, a second rendering section 66b, a print control section 63, and a print section 64.

The same sections as those of the first embodiment are given the same reference numerals, and the description thereof is omitted.

Thick solid arrows indicate a data flow, and thick dashed arrows indicate data flow added when the second rendering section 66b is suspended.

Each of the cores constituting the control section 41 reads and executes a program corresponding to the assigned processing from the ROM 43 to implement each function of the image processing apparatus 40B.

The first core 41a is previously assigned with the analysis processing. The first core 41a reads and executes the analysis processing program 51 to function as the first analysis section 65a.

The second core 41b is previously assigned with the analysis processing and rendering processing. The second core 41b reads and executes the analysis processing program 51 to function as the second analysis section 65b, and reads and executes the rendering processing program 52 to function as the second rendering section 66b. As for the analysis processing and rendering processing assigned to the second core 41b, the rendering processing is set to have a higher priority of execution than that of the analysis processing.

Hereinafter, the function of each section will be described.

The first analysis section 65a interprets data inputted from the external apparatus 80 and generates intermediate language format data (hereinafter, referred to as intermediate data) which is between the inputted data and bitmap format data (hereinafter, referred to as bitmap data) by the band. The first analysis section 65a then stores the generated intermediate data in the analysis expansion region of the data expansion region in the RAM 42.

The data inputted from the external apparatus 80 and the intermediate data are the same as those of the first embodiment, and the description thereof is omitted.

In response to the request from the second rendering section 66b, the second analysis section 65b refers to the analysis event table 57 to interpret the data inputted from the external apparatus 80, and generates intermediate data by the band. The second analysis section 65b then stores the generated intermediate data in the analysis expansion region of the data expansion region in the RAM 42.

FIG. 11 shows an example of the analysis event table 57 in the second embodiment.

The analysis event table 57 is provided for the analysis processing program to execute the analysis processing. The analysis event table 57 includes records each relating an event which can occur during execution of the analysis processing (an event) to instruction information of a processing to be executed for the event (an action) and an event which occurs after execution of the action (a next event). The records are set in terms of the events which can occur during the analysis processing.

The second rendering section 66b refers to the rendering event table 58 to generate bitmap data from the intermediate data which is generated by the first or second analysis section 65a or 65b and stored in the analysis expansion region. The second rendering section 66b stores the generated bitmap data in the rendering expansion region of the data expansion region in the RAM 42.

FIG. 12 shows an example of the rendering event table 58 in the second embodiment.

The rendering event table 58 is provided for the rendering processing program to execute the rendering processing. The rendering event table 58 includes records each relating an event which can occur during execution of the rendering processing (an event), instruction information of a process to be executed for the event (an action), and an event which occurs after execution of the action (a next event). The records are set in terms of the events which can occur during the execution of the rendering processing. The rendering event table 58 of the second embodiment includes, as the event information, a record relating an event which suspends the rendering processing to an action requesting execution of the analysis processing which has a lower priority than the rendering processing and is different from the rendering processing.

The events which suspend the rendering processing include "Waiting for vacant region".

The event "Waiting for vacant region" is an event which occurs due to absence of a region to store the bitmap data in the rendering expansion region. Specifically, when the processing at the print control section or print section is suspended due to out of paper, out of toner, or the like, the stored bitmap data is not released in a region of the data expansion region of the RAM 42 which is configured to store bitmap data (the rendering expansion region), thus causing absence of the region to store the bitmap data. The event "Waiting for vacant region" represents that there is no vacant region in the rendering expansion region used for execution of the rendering processing.

The action of the record including the "Waiting for vacant region" is "Analysis request is notified" to output a notification of a request for the analysis processing. The next event of the same is "Waiting for rendering memory release notification" to wait for the release notification which is outputted from the print control section, representing that the bitmap data stored in the rendering expansion region is released.

Next, the operation of the second embodiment will be described.

Figure 13:
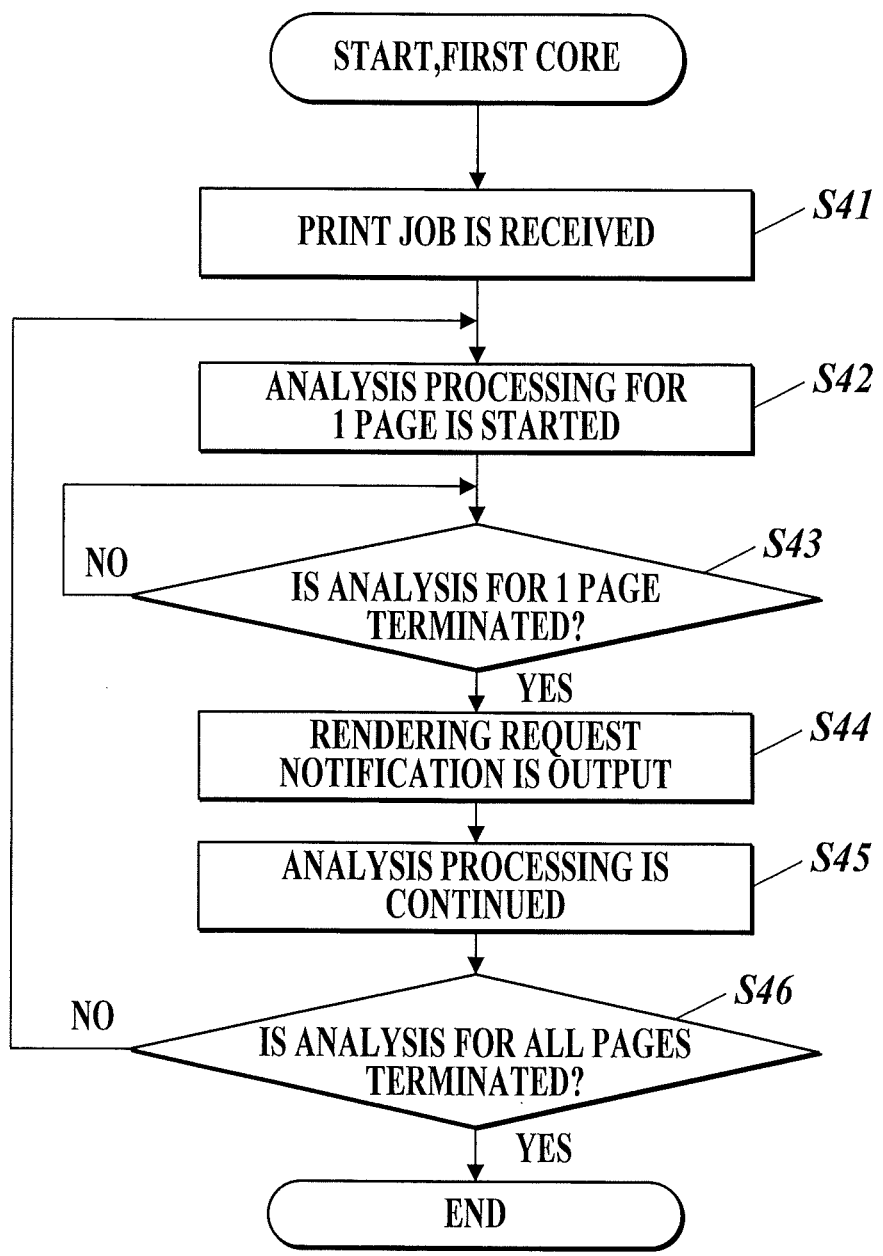
FIG. 13 is a flowchart of an operation executed by the first core in the second embodiment.

FIG. 13 shows a flowchart of the operation executed by the first core 41a in the second embodiment.

Upon receiving a print job including page description language data of one or a plurality of pages from the external apparatus 80 through the communication apparatus 45 (step S41), the first core 41a causes the first analysis section 65a to function, and to start execution of the analysis processing for the page description language data of one page (step S42).

The first core 41a then judges whether the analysis processing of the one page is terminated (step S43). If the analysis processing of the one page is not terminated (the step S43; NO), the first core 41a returns to the processing of the step S43.

If the analysis processing of the one page is terminated (the step S43; YES), the first core 41a outputs a rendering request notification to the second core 41b (step S44) and returns to continue the analysis processing by the first analysis section 65a (step S45). The first core 41a then judges whether the analysis processing of all the pages is terminated (step S46). In the step S46, whether the analysis processing for all the pages is terminated is judged by judging whether the job termination command included in the print job is analyzed.

If the analysis processing for all the pages is not terminated yet (the step S46; NO), the first core 41a returns to the processing of the step S42. If the analysis processing of all the pages is terminated (the step S46; YES), the first core 41a terminates this processing.

Figure 14:
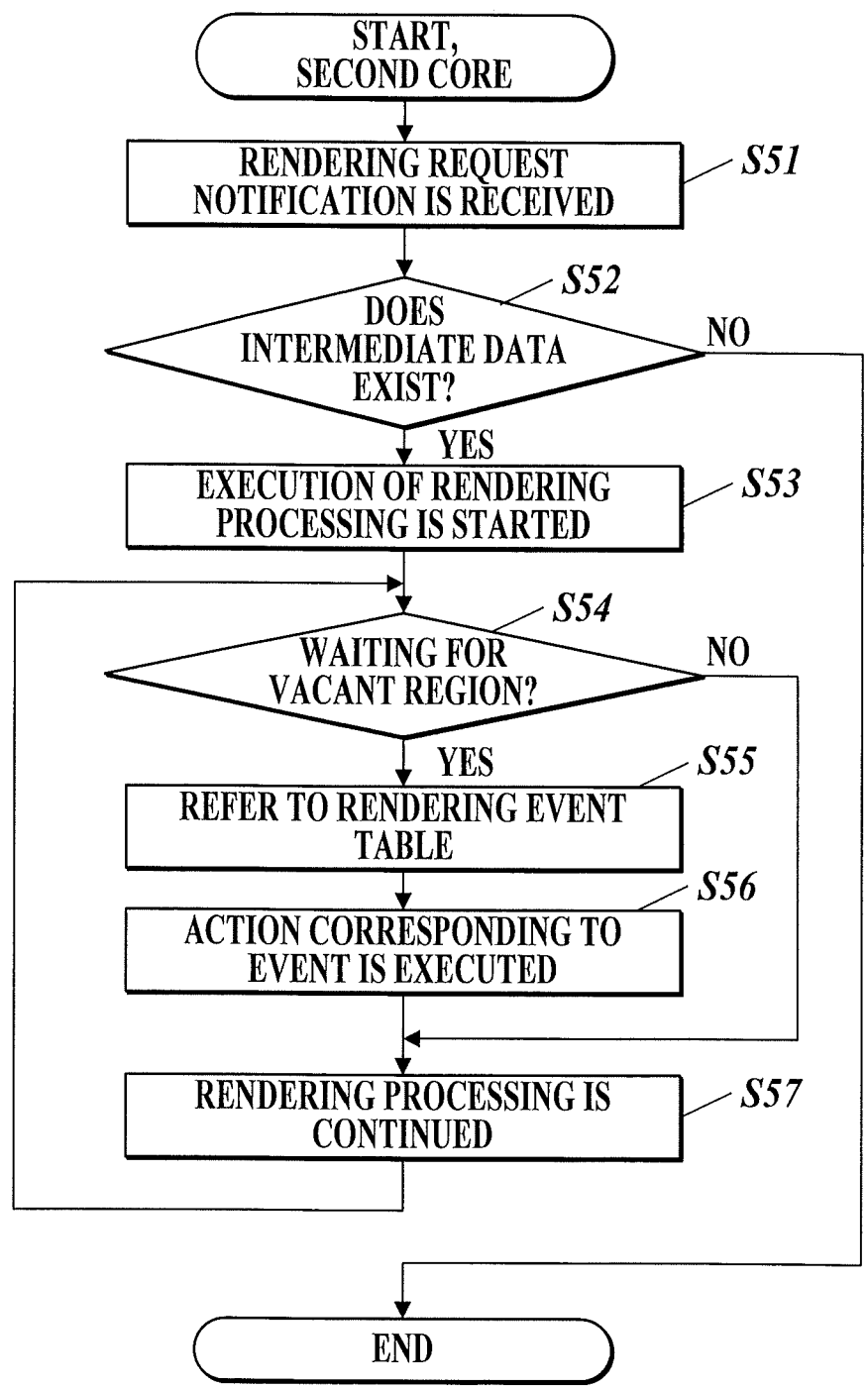
FIG. 14 is a flowchart of an operation executed by the second core in the second embodiment.

FIG. 14 shows an operation flow executed by the second core 41b in the second embodiment.

Upon receiving the rendering request notification (step S51), the second core 41b causes the second rendering section 66b to function and judges whether there is intermediate data in the analysis expansion region (step S52).

If there is no intermediate data in the analysis expansion region of the RAM 42 (the step S52; NO), the second core 41b terminates this processing.

If there is intermediate data in the analysis expansion region of the RAM 42 (the step S52; YES), the second core 41b reads the intermediate data stored in the analysis expansion region and starts execution of the rendering processing for the read intermediate data (step S53).

The second core 41b which is causing the second rendering section 66b to function judges whether the event "Waiting for vacant region" occurs during the execution of the rendering processing by the second rendering section 66b (step S54). If the event "Waiting for vacant region" does not occur (the step S54; NO), the second core 41b proceeds to the processing of the step S57.

If the event "Waiting for vacant region" occurs (the step S54; YES), the second core 41b refers to the rendering event table 58 to select a record corresponding to the event "Waiting for vacant region" (step S55), and executes the action of the selected record ("Analysis request is notified"). The second core 41b causes the second analysis section 65b to function and executes the analysis processing (step S56).

After it is judged NO in the step S54 or after the step S56, the second core 41b returns to continue the rendering processing by the second rendering section 66b (step S57) and then returns to the processing of the step S54.

Figure 15:
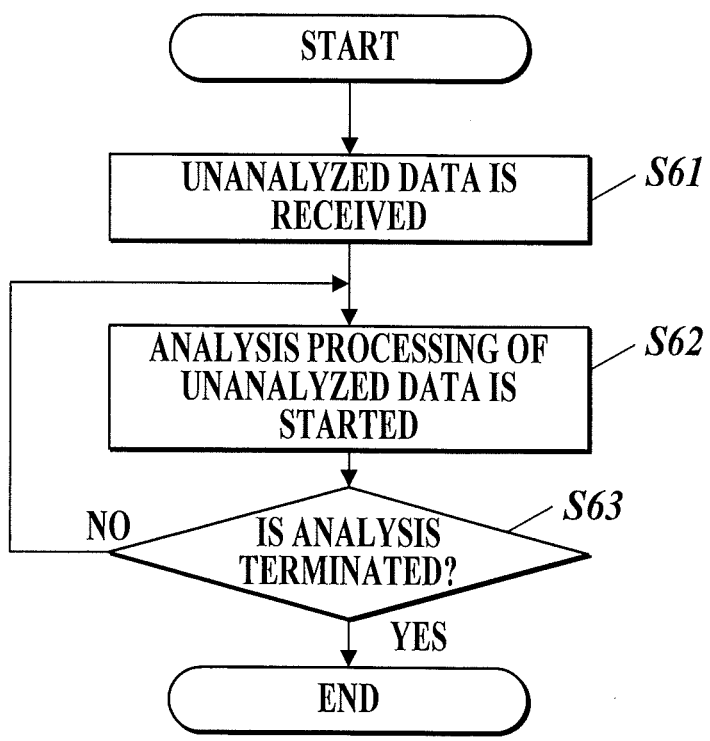
FIG. 15 is a flowchart of an operation executed at step S56 by a second analysis section caused to function by the second core.

FIG. 15 shows a flowchart of the operation executed at the step 56 by the second analysis section 65b caused to function by the second core 41b.

When the analysis request notification is outputted from the second rendering section 66b, the second core 41b causes the second analysis section 65b to function and receives unanalyzed part of the page description language data which is being subjected to the analysis processing (unanalyzed data) from the external apparatus 80 (step S61). The second core 41b starts execution of the analysis processing for the received unanalyzed data (step S62).

The second core 41b judges whether the analysis processing for the received unanalyzed data is terminated (step S63). If the analysis processing for the unanalyzed data is not terminated (the step S63; NO), the second core 41b returns to the processing of the step S62. If the analysis processing for the unanalyzed data is terminated (the step S63; YES), the second core 41b terminates this processing.

Figure 16A:
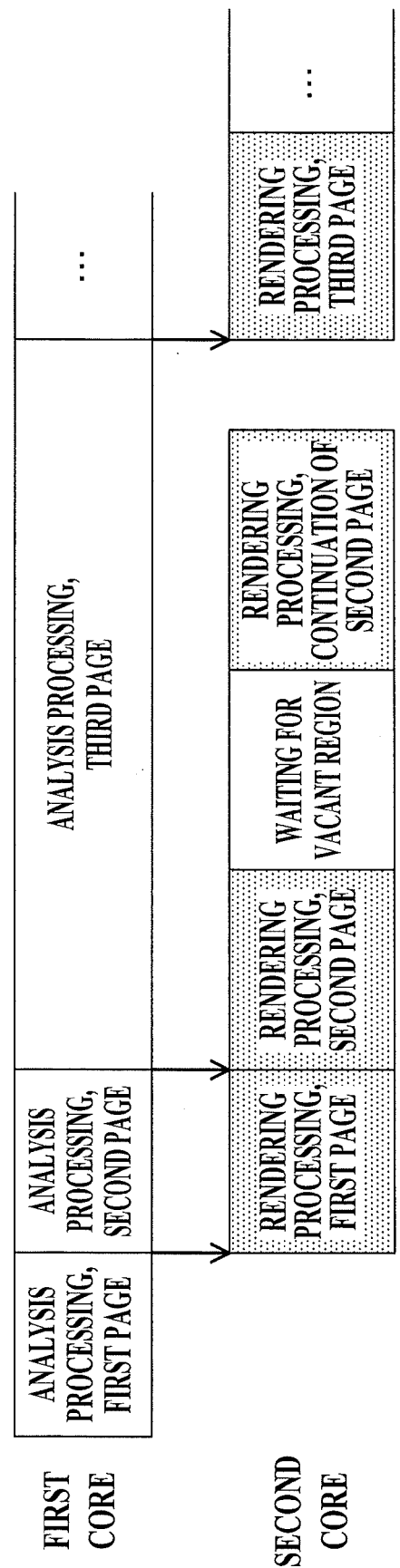
FIG. 16A is a view showing a conventional operation example.
Figure 16B:
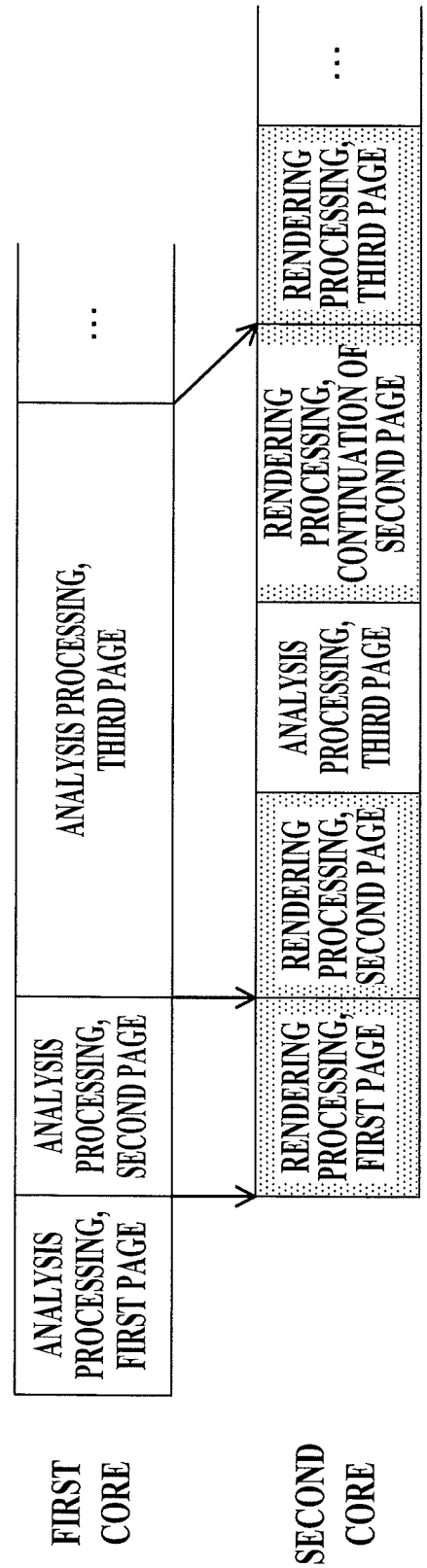
FIG. 16B is a view showing an operation example of the second embodiment.

FIG. 16A shows a conventional operation example, and FIG. 16B shows an operation example of the second embodiment.

In the conventional operation example shown in FIG. 16A, it is assumed that the first and second cores are previously assigned with the analysis processing and rendering processing, respectively.

As shown in FIG. 16A, in the conventional operation, when the processing by the print control section and print section is suspended due to an error such as out of paper or toner while the rendering processing of the second page is being executed by the second core, the bitmap data stored in the rendering expansion region is not released, and the event of waiting for a vacant region in the rendering expansion region occurs. The second core suspends the rendering processing and goes into a standby state until a vacant region is generated in the rendering memory after the event of waiting for a vacant region in the rendering memory occurs. On the other hand, the first core performs the analysis processing solely.

Accordingly, the conventional operation spends wasted time when the second core is not operating, thus resulting in a lower efficiency of the series of processing to generate print data.

In the second embodiment, as shown in FIG. 16B, when the event of waiting for a vacant region in the rendering expansion region occurs while the rendering processing of the second page is being executed by the second core, the analysis request notification is outputted. Upon the output of the analysis request notification, the second core causes the second analysis section 65a to function and executes the analysis processing of the page currently being subjected to analysis processing (herein, the third page) until the event of waiting for a vacant region in the rendering expansion region resolves. When the rendering memory release notification is outputted from the print control unit to resolve the event of waiting for a vacant region in the rendering expansion region, the second core restarts the rendering processing at the second rendering section 66b. The analysis processing for the third page is thus executed by both the first and second cores. Accordingly, the time taken to complete the analysis processing of the third page is shortened, and the wasted time when the second core is not operating can be eliminated.

As described above, according to the first and second embodiments, when an event which suspends the processing which is being executed occurs, the first or second core can execute another processing. It is therefore possible to reduce the processing standby time when the first or second core remains in the standby state until the event suspending the processing is resolved, thus increasing the processing efficiency.

Moreover, when the event which suspends one of the analysis processing and rendering processing having a higher priority occurs, the first or second core can execute the other processing. It is therefore possible to reduce the processing standby time when the first or second core remains in the standby state until the event which suspends the processing with the highest priority is resolved.

When an event which suspends the processing being executed, another processing can be executed by executing the action for the event with reference to the event table (the analysis or rendering event table) corresponding to the process being executed.

Furthermore, when there is no vacant region in a region (the analysis or rendering expansion region) of the data expansion region of the RAM 42 which is used for the processing being executed, another processing can be executed. It is therefore possible to reduce the processing standby time when the first or second core remains in the standby state due to waiting for a vacant region.

Furthermore, when there is no data intended to be subjected to the processing being executed, another processing can be executed. It is therefore possible to reduce the processing standby time due to waiting for data.

The aforementioned description discloses the example where the computer readable medium for the program according to the present invention is the ROM 43, however, the present invention is not limited to this example.

Another computer readable medium can be a nonvolatile memory such as flash memory and a portable recording medium such as a CD-ROM.

Moreover, as the medium providing data of the program according to the present invention through the communication line, a carrier wave may also be applied to the present invention.

The present invention is not limited to the contents of the first and second embodiments, and may be a combination of the first and second embodiments. The present invention can be properly changed without departing from the scope of the invention.

According to an aspect of the preferred embodiments of the present invention, there is provided an image processing apparatus, comprising:

a control section including a plurality of operation units; and a nonvolatile storage section to store a program to execute analysis processing and rendering processing by a control of the control section, the analysis processing analyzing page description language format data to generate intermediate language format data by the band, and the rendering processing generating rendering data based on the intermediate language format data generated by the analysis processing, wherein the control section assigns the plurality of operation units the analysis processing and the rendering processing to be executed, based on the program stored in the nonvolatile storage section, wherein at least one of the plurality of operation units is capable of executing the analysis processing and the rendering processing, and wherein when the operation unit is executing one of the analysis processing and the rendering processing, and when an event which suspends the processing being executed occurs, the operation unit executes the other processing.

According to another aspect of the preferred embodiments of the present invention, there is provided an image processing method of an image processing apparatus including: a control section having a plurality of operation units; and a nonvolatile storage section to store a program to execute analysis processing and rendering processing by a control of the control section, the analysis processing analyzing page description language format data to generate intermediate language format data by the band, and the rendering processing generating rendering data based on the intermediate language format data generated by the analysis processing, wherein the analysis processing and the rendering processing are assigned to the plurality of operation units to be executed, the image processing method comprising:

a first step of assigning at least one of the plurality of operation units in the image processing apparatus the analysis processing and the rendering processing to be executed; and a second step of, when the operation unit capable of executing the analysis processing and the rendering processing is executing one of the analysis processing and rendering processing, and when an event which suspends the processing being executed occurs, instructing the operation unit to execute the other processing.

According to still another aspect of the preferred embodiments of the present invention, there is provided a recording medium storing a computer-executable program to be executed by a computer including a plurality of operation units, the program assigning the plurality of operation units analysis processing and rendering processing, the analysis processing analyzing page description language format data to generate intermediate language format data by the band, and the rendering processing generating rendering data based on the intermediate language format data generated by the analysis processing, the recording medium causing the control section to execute:

a first function of assigning at least one of the plurality of operation units the analysis processing and the rendering processing to be executed, and a second function of, when the operation unit is executing one of the analysis processing and rendering processing, and when an event which suspends the processing being executed occurs, instructing the operation unit to execute the other processing.

According to the image processing apparatus, the image processing method, and the recording medium provided by the preferred embodiments of the present invention, it is possible to reduce the processing standby time when the operation unit remains in the standby state until the event suspending the processing is resolved, thus increasing the processing efficiency.

Preferably, the operation unit capable of executing the analysis processing and the rendering processing includes priority of an execution set to the analysis processing and the rendering processing, and wherein when the operation unit is executing one of the analysis processing and the rendering processing having higher priority, and when an event which suspends the processing being executed occurs, the operation unit executes the other processing.

According to the preferred embodiments of the present invention, when the event which suspends one of the analysis processing and rendering processing having higher priority occurs during the processing is being executed, the other processing can be executed. It is therefore possible to reduce the processing standby time when the operation unit remains in the standby state until the event which suspends the processing with the highest priority is resolved.

Preferably, when the event is resolved during an execution of the other processing, the operation unit capable of executing the analysis processing and the rendering processing executes the processing which has been suspended.

Preferably, the nonvolatile storage section stores event information for each of the analysis processing and the rendering processing, the event information relating the event which suspends the processing being executed to instruction information of processing which is to be executed in response to the event and is different from the suspended processing, and wherein when the event which suspends the processing being executed occurs during an execution of the processing, the operation unit capable of executing the analysis processing and the rendering processing refers to the event information corresponding to the processing being executed to execute the processing indicated by the instruction information related to the event.

According to the preferred embodiments of the present invention, when an event which suspends the processing being executed occurs, the event information corresponding to the processing which is being executed is referred to, and thus processing indicated by the instruction information related to the event can be executed.

Preferably, the image processing apparatus further comprises:

a volatile storage section including an analysis expansion region used for an execution of the analysis processing and a rendering expansion region used for an execution of the rendering processing, wherein the event which suspends the processing being executed is absence of a vacant region in the analysis expansion region or the rendering expansion region used for the processing being executed.

According to the preferred embodiments of the present invention, when there is no vacant region in a region which is used for the processing being executed, another processing can be executed. It is therefore possible to reduce the processing standby time when the operation unit remains in the standby state due to waiting for a vacant region.

Preferably, the event which suspends the processing being executed is absence of data to be subjected to the processing being executed.

According to the preferred embodiments of the present invention, when there is no data intended to be subjected to the processing being executed, another processing can be executed. It is therefore possible to reduce the processing standby time of the operation unit due to waiting for data.

What is claimed is:

1. An image processing apparatus, comprising:
a control section including a plurality of operation units; and
a nonvolatile storage section to store a program to execute analysis processing and rendering processing by a control of the control section, the analysis processing analyzing page description language format data to generate intermediate language, and the rendering processing generating rendering data based on the intermediate language format data generated by the analysis processing, wherein
a first operation unit and a second operation unit are capable of executing the analysis processing and the rendering processing;
the control section controls the first operation unit to execute the analysis processing, and controls the second operation unit to execute the rendering processing, wherein
when an event occurs which suspends the analysis processing being executed by the first operation unit, the first operation unit switches to the rendering processing being executed by the second operation unit and executes the rendering processing in parallel with the second operation unit; and
when an event occurs which suspends the rendering processing being executed by the second operation unit, the second operation unit switches to the analysis processing being executed by the first operation unit and executes the analysis processing in parallel with the first operation unit.

2. The image processing apparatus according to claim 1, wherein
the first operation unit includes priority of an execution set to the analysis processing and the rendering processing, and wherein when the first operation unit is executing the processing having higher priority, and when the event occurs which suspends the analysis processing being executed, the first operation unit executes the rendering processing.

3. The image processing apparatus according to claim 1, wherein when the event which suspends the analysis processing is resolved during an execution of the rendering processing, the first operation unit executes the processing which has been suspended.

4. The image processing apparatus according to claim 1, wherein the nonvolatile storage section stores event information for each of the analysis processing and the rendering processing, the event information relating the events which suspend the processings being executed to instruction information of processings which are to be executed in response to the events and are different from the suspended processings, and wherein
when the events which suspend the processings being executed occur during an execution of the processings, the first operation unit or the second processing unit refers to the event information corresponding to the processings being executed to execute the processings indicated by the instruction information related to the events.

5. The image processing apparatus according to claim 1, further comprising:
a volatile storage section including an analysis expansion region used for an execution of the analysis processing and a rendering expansion region used for an execution of the rendering processing, wherein
the events which suspend the processings being executed are absence of a vacant region in the analysis expansion region or the rendering expansion region used for the processing being executed.

6. The image processing apparatus according to claim 1, wherein the second operation unit includes priority of an execution set to the analysis processing and the rendering processing, and wherein
when the second operation unit is executing the rendering processing having higher priority, and when the event occurs which suspends the rendering processing being executed, the second operation unit executes the analysis processing.

7. The image processing apparatus according to claim 1, wherein when the event which suspends the rendering processing is resolved during an execution of the analysis processing, the second operation unit executes the processing which has been suspended.

8. An image processing method of an image processing apparatus including:
a control section having a plurality of operation units; and
a nonvolatile storage section to store a program to execute analysis processing and rendering processing by a control of the control section, the analysis processing analyzing page description language format data to generate intermediate language format data, and the rendering processing generating rendering data based on the intermediate language format data generated by the analysis processing, wherein
a first operation unit and a second operation unit in the image processing apparatus are capable of executing the analysis processing and the rendering processing, the image processing method comprising:
a first step of controlling the first operation unit to execute the analysis processing, and controlling a second operation unit to execute the rendering processing;
a second step of, when an event occurs which suspends the analysis processing being executed by the first operation unit, instructing the first operation unit to switch to the rendering processing being executed by the second operation unit and to execute the rendering processing in parallel with the second operation unit; and
when an event occurs which suspends the rendering processing being executed by the second operation unit, instructing the second operation unit to switch to the analysis processing being executed by the first operation unit and to execute the analysis processing in parallel with the first operation unit.

9. The image processing method according to claim 8, wherein priority of an execution is set to the analysis processing and the rendering processing for the first operation unit, and wherein
in the second step, when the first operation unit is executing the analysis processing having higher priority, and when the event occurs which suspends the analysis processing being executed, the first operation unit is instructed to execute the rendering processing.

10. The image processing method according to claim 8, further comprising:
a third step of, when the event which suspends the analysis processing is resolved during an execution of the rendering processing, instructing the first operation unit to execute the processing which has been suspended.

11. The image processing method according to claim 8, wherein
the nonvolatile storage section of the image processing apparatus stores event information for each of the analysis processing and the rendering processing, the event information relating the events which suspend the processings being executed to instruction information of processing which are to be executed in response to the events and are different from the suspended processings, and wherein
in the second step, when the events which suspend the processings being executed occur during an execution of the processings, the first operation unit or the second processing unit is instructed to refer to the event information corresponding to the processings being executed and execute the processings indicated by the instruction information related to the events.

12. The image processing method according to claim 8, wherein the image forming apparatus further includes:
a volatile storage section including an analysis expansion region used for an execution of the analysis processing and a rendering expansion region used for an execution of the rendering processing, and wherein
the events which suspend the processings being executed are absence of a vacant region in the analysis expansion region or the rendering expansion region used for the processing being executed.

13. The image processing method according to claim 8, wherein priority of an execution is set to the analysis processing and the rendering processing for the second operation unit, and wherein
in the second step, when the second operation unit is executing the rendering processing having higher priority, and when the event occurs which suspends the rendering processing being executed, the second operation unit is instructed to execute the analysis processing.

14. The image processing method according to claim 8, further comprising: a third step of, when the event which suspends the rendering processing is resolved during an execution of the analysis processing, instructing the second operation unit to execute the processing which has been suspended.

15. A non-transitory computer-readable recording medium storing a computer-executable program to be executed by a computer including a plurality of operation units, the program controlling the plurality of operation units to perform analysis processing and rendering processing, the analysis processing analyzing page description language format data to generate intermediate language format data, and the rendering processing generating rendering data based on the intermediate language format data generated by the analysis processing, wherein a first operation unit and a second operation unit are capable of executing the analysis processing and the rendering processing, the recording medium causing a control section to execute:

a first function of controlling the first operation unit to execute the analysis processing, and controlling the second operation unit to execute the rendering processing, and a second function of, when an event occurs which suspends the analysis processing being executed by the first operation unit, instructing the first operation unit to switch to the rendering processing being executed by the second operation unit and to execute the rendering processing in parallel with the second operation unit; and when an event occurs which suspends the rendering processing being executed by the second operation unit, instructing the second operation unit to switch to the analysis processing being executed by the first operation unit and to execute the analysis processing in parallel with the first operation unit.

16. The recording medium according to claim 15, wherein priority of an execution is set to the analysis processing and the rendering processing for the first operation unit, and wherein in the second function, when the first operation unit is executing the analysis processing having higher priority, and when the event occurs which suspends the analysis processing being executed, the first operation unit is instructed to execute the rendering processing.

17. The recording medium according to claim 15, wherein the program further includes a third function of, when the event which suspends the analysis processing is resolved during an execution of the rendering processing, instructing the first operation unit to execute the processing which has been suspended.

18. The recording medium according to claim 15, wherein the program stores event information for each of the analysis processing and the rendering processing, the event information relating the events which suspend the processings being executed to instruction information of processing which are to be executed in response to the events and are different from the suspended processings, and wherein in the second function, when the events which suspend the processings being executed occur during an execution of the processings, the first operation unit or the second processing unit is instructed to refer to the event information corresponding to the processings being executed and execute the processings indicated by the instruction information related to the events.

19. The recording medium according to claim 15, wherein the computer further includes a volatile storage section having an analysis expansion region used for an execution of the analysis processing and a rendering expansion region used for an execution of the rendering processing, and wherein the events which suspend the processings being executed are absence of a vacant region in the analysis expansion region or the rendering expansion region used for the processing being executed.

20. The recording medium according to claim 15, wherein priority of an execution is set to the analysis processing and the rendering processing for the second operation unit, and wherein in the second function, when the second operation unit is executing the rendering processing having higher priority, and when the event occurs which suspends the rendering processing being executed, the second operation unit is instructed to execute the analysis processing.

21. The recording medium according to claim 15, wherein the program further includes a third function of, when the event which suspends the rendering processing is resolved during an execution of the analysis processing, the second operation unit is instructed to execute the processing which has been suspended.

* * * * *

UNITED STATES PATENT AND TRADEMARK OFFICE
CERTIFICATE OF CORRECTION

| | |
|---|---|
| PATENT NO. | : 8,675,212 B2 |
| APPLICATION NO. | : 13/044993 |
| DATED | : March 18, 2014 |
| INVENTOR(S) | : Fumihito Akiyama et al. |

It is certified that error appears in the above-identified patent and that said Letters Patent is hereby corrected as shown below:

Title Page, Item (73) Assignee: change "Konica Minolta Business Technologies, Ltd." to --Konica Minolta Business Technologies, Inc.--.

Signed and Sealed this
Fifteenth Day of July, 2014

Michelle K. Lee
*Deputy Director of the United States Patent and Trademark Office*